United States Patent
Ru

(10) Patent No.: US 12,457,496 B2
(45) Date of Patent: Oct. 28, 2025

(54) WIRELESS COMMUNICATION METHOD AND CONFIGURATION DEVICE

(71) Applicant: GUANGDONG OPPO MOBILE TELECOMMUNICATIONS CORP., LTD., Guangdong (CN)

(72) Inventor: Zhao Ru, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 280 days.

(21) Appl. No.: 18/484,386

(22) Filed: Oct. 10, 2023

(65) Prior Publication Data

US 2024/0048984 A1 Feb. 8, 2024

Related U.S. Application Data

(63) Continuation of application No. PCT/CN2021/087610, filed on Apr. 15, 2021.

(51) Int. Cl.
*H04W 12/069* (2021.01)
*H04W 12/08* (2021.01)

(52) U.S. Cl.
CPC ......... *H04W 12/069* (2021.01); *H04W 12/08* (2013.01)

(58) Field of Classification Search
CPC .............................. G06F 21/31; H04W 12/069
See application file for complete search history.

(56) References Cited

U.S. PATENT DOCUMENTS

| 11,025,627 | B2* | 6/2021 | Li | H04W 12/06 |
|---|---|---|---|---|
| 2014/0242940 | A1 | 8/2014 | Koo | |
| 2016/0112429 | A1 | 4/2016 | Sundaresan et al. | |
| 2017/0279620 | A1* | 9/2017 | Kravitz | H04L 63/0876 |
| 2021/0329451 | A1* | 10/2021 | Jun | H04L 67/125 |

FOREIGN PATENT DOCUMENTS

| CN | 107111697 A | 8/2017 |
|---|---|---|
| CN | 108156176 A | 6/2018 |
| CN | 111800270 A | 10/2020 |
| WO | 2020055045 A1 | 3/2020 |
| WO | 2022217561 A1 | 10/2022 |

OTHER PUBLICATIONS

International Search Report for International Application No. PCT/CN2021/087610, mailed Jan. 19, 2022.
Written Opinion of International Searching Authority for International Application No. PCT/CN2021/087610 mailed Jan. 19, 2022, with partial translation by the applicant's foreign counsel and machine English translation provided by WIPO.

* cited by examiner

*Primary Examiner* — Bryan Y Lee
(74) *Attorney, Agent, or Firm* — Ladas & Parry, LLP

(57) ABSTRACT

A wireless communication method and a configuration device are provided. The wireless communication method includes: receiving, by a first configuration device, role information configured to indicate a role of a device represented by a certificate; and transmitting, by the first configuration device, first information to a smart terminal, the first information comprising a target application certificate at least comprising the role information.

20 Claims, 7 Drawing Sheets

WIRELESS COMMUNICATION METHOD AND CONFIGURATION DEVICE

CROSS REFERENCE TO RELATED APPLICATIONS

The present disclosure is a continuation of International Patent Application No. PCT/CN2021/087610, filed Apr. 15, 2021, the contents of which is herein incorporated by reference in its entirety.

TECHNICAL FIELD

Embodiments of the disclosure relates to the field of the Internet of Things, in particular to a wireless communication method and a configuration device.

BACKGROUND

In a scenario for an interconnection of cross-Fabrics, a configuration device with administrator privileges in Fabric A may share its administrator privileges with a configuration device in Fabric B. However, during the sharing process, the configuration device with the administrator privileges in Fabric A needs to transmit a certificate of Fabric A and information of Fabric A to the configuration device in Fabric B, such that the configuration device in Fabric B is added to Fabric A and have the administrator privileges in Fabric A. However, this manner will expand privileges of the configuration device in Fabric B, and will result in leakage of the information of Fabric A.

SUMMARY

In a first aspect, a wireless communication method is provided and includes: receiving, by a first configuration device, role information configured to indicate a role of a device represented by a certificate; and transmitting, by the first configuration device, first information to a smart terminal, the first information comprising a target application certificate at least comprising the role information.

In a second aspect, a wireless communication method is provided and includes: receiving, by a smart terminal, first information transmitted by a first configuration device, the first information comprising a target application certificate, and the target application certificate at least comprising role information configured to indicate a role of a device represented by a certificate; and determining, by the smart terminal, an access privilege of the first configuration device according to the role information.

In a third aspect, a configuration device is provided and includes a processor and a memory. The memory is configured to store a computer program, and the processor is configured to configured to call and run the computer program stored in the memory and perform a method in the first aspect.

DETAILED DESCRIPTION

The technical solutions in some embodiments of the present disclosure are described in conjunction with the drawings in some embodiments of the present disclosure. It is obvious that the described embodiments are only some embodiments of the present disclosure, and not all embodiments. All other embodiments acquired by those skilled in the art based on the embodiments in the present disclosure without the creative work are all within the scope of the present disclosure.

In the field of the Internet of Things, different operators may establish different Fabrics, and may carry out a control access to one or more smart terminals in a same Fabric through a configuration device. For example, a smart bulb may be carried out a control access through a mobile phone to turn the smart bulb on or off, etc. Devices in a same Fabric may acquire a root certificate of the Fabric and information of the Fabric. Configuration devices with administrator privileges in the same Fabric may share their administrator privileges with other configuration device, such that the other configuration device may also have administrator privileges to one or more smart terminals in the Fabric. However, in an interconnection scenario of a cross fabric, a configuration device with administrator privileges in Fabric A may share its administrator privileges with a configuration device in Fabric B. However, during the sharing process, the configuration device with administrator privileges in Fabric A needs to transmit a certificate of Fabric A and information of Fabric A to the configuration device in Fabric B, such that the configuration device in Fabric B is added to Fabric A and have the administrator privileges in Fabric A. This manner will expand privileges of the configuration device in Fabric B, and will also result in leakage of information of Fabric A.

Figure 1:
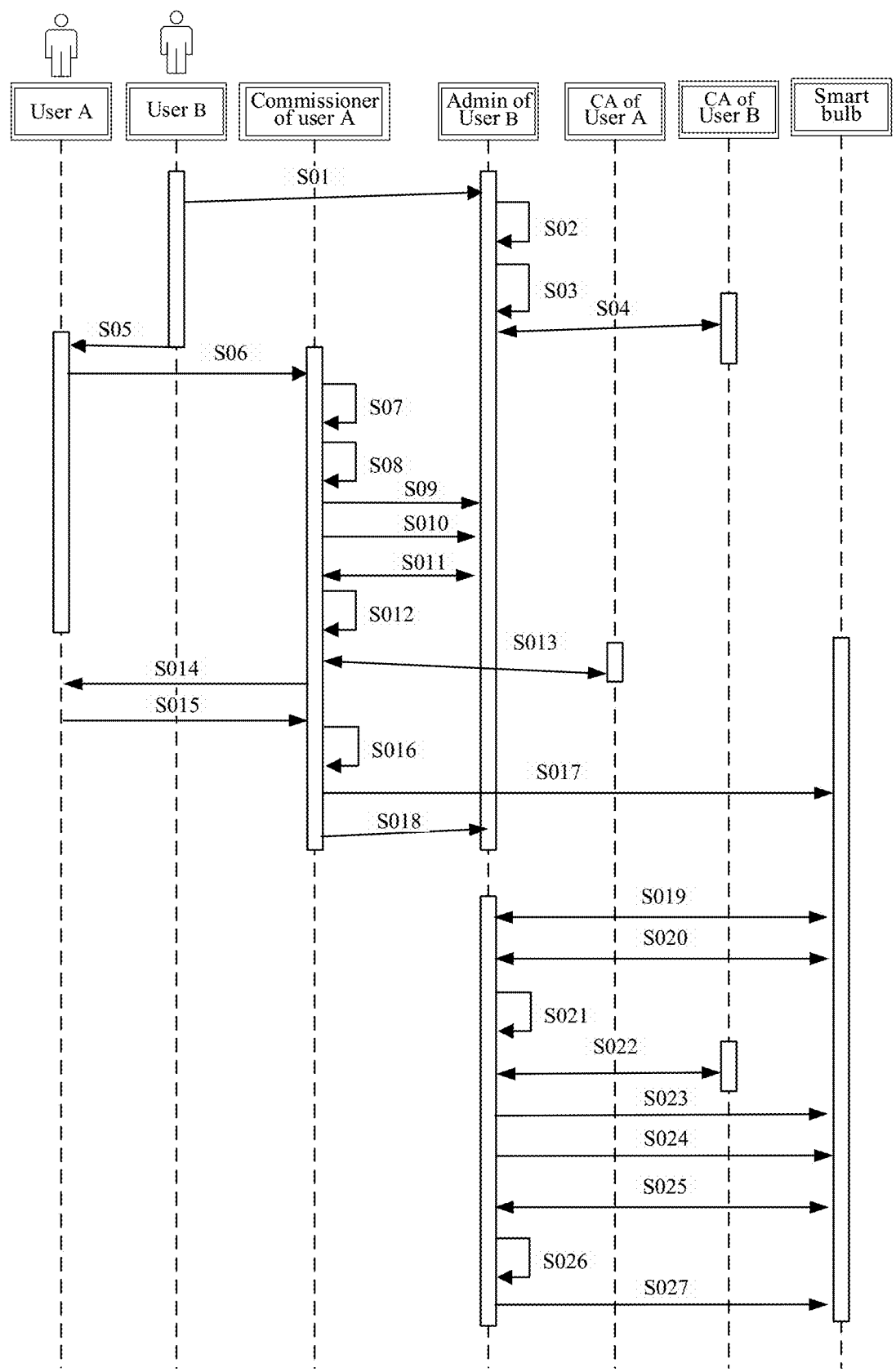
FIG. 1 is a flowchart of a privilege sharing method according to some embodiments of the present disclosure.

As shown in FIG. 1, a user A bought a smart bulb, which is a product authenticated by the Connected Home over IP Working Group (CHIP) under the Alliance, and supports a Bluetooth Low Energy (BLE) and/or a Wireless Fidelity (WiFi). The user A uses application A (A-APP) on his mobile phone to configure the smart bulb in a living room, and later the user A may use A-APP to control the smart bulb. In this case, A-APP is an administrator (Admin), a commissioner, and a controller. The user A adds a B-APP to a user B's mobile phone as a second admin and controller of the smart bulb. The user A may share its administrator privilege of the user B through operations S01-S027.

At operation S01, the user B triggers the B-APP in the mobile phone to join the user A's family (i.e., the user A's Fabric).

At operation S02, the user B's B-APP generates a two-dimensional code.

At operation S03, the user B's B-APP starts a pairing broadcast.

At operation S04, the user B's B-APP acquires a certificate chain from a corresponding Certificate Authority (CA) device of the user B.

At operation S05, the user B shares the two-dimensional code with the user A.

At operation S06, the user A triggers the A-APP to add the user B to the user A's family (i.e., the user A's Fabric).

At operation S07, the A-APP acquires two-dimensional code information of the B-APP.

At operation S08, the A-APP starts pairing scanning.

At operation S09, the A-APP establishes a connection with the B-APP.

At operation S010, the A-APP negotiates with the B-APP to establish a secure channel through the two-dimensional code information.

At operation S011, the A-APP acquires B-APP's authentication request, which includes the B-APP's signature and certificate chain.

At operation S012, the A-APP authenticates the B-APP.

At operation S013, the A-APP request a certificate for the B-APP from a CA device corresponding to the user A.

At operation S014, the A-APP transmits a confirmation request to the user A.

At operation S015, the user A confirms a privilege given to the user B.

At operation S016, the A-APP generates a corresponding Access Control Lists Entry (ACLE).

At operation S017, the A-APP configures the ACLE to the smart bulb.

At operation S018, the A-APP transmits a root certificate corresponding to the user A, a certificate generated for the B-APP by the CA device corresponding to the user A, and Fabric information to the B-APP.

At operation S019, the B-APP establishes a secure channel with the smart bulb, through the certificate generated for the B-APP itself by the CA device corresponding to the user A.

At operation S020, the B-APP acquires an authentication request of the smart bulb.

At operation S021, the B-APP authenticates the smart bulb.

At operation S022, the user B request a certificate for the smart bulb from the CA device corresponding to the B-APP.

At operation S023, the B-APP configures the requested certificate chain to the smart bulb.

At operation S024, the B-APP closes the secure channel established with the smart bulb.

At operation S025, the B-APP establishes the secure channel with the smart bulb, through the certificate generated for the B-APP itself by the CA device corresponding to the user A.

At operation S026, the B-APP generates the ACLE.

At operation S027, the B-APP configures the ACLE to the smart bulb.

In this case, the user B may use the B-APP to control the smart bulb and see a state of the smart bulb. The User B's B-APP may also configure other smart terminals to User A's family (i.e., User A's Fabric).

In operation S018 in FIG. 1 above, the user A configures the B-APP into the Fabric A, and then the B-APP acquires information and certificate of Fabric A, which expands B-APP's privilege and easily results in leakage of sensitive information of the Fabric A.

It should be noted that the Fabric may also be understood as a platform, an ecology, or a similar object, which is not limited.

Based on the above problems, the present disclosure provides a solution for sharing privileges. A configuration device with administrator privilege in Fabric A may share role information to a configuration device in Fabric B, such that the configuration device in Fabric B may acquire an access privilege to a smart terminal in Fabric A based on the role information, avoiding expanding the privilege of the configuration device in Fabric B. In addition, the problem of leakage of information in Fabric A is avoided.

To facilitate a better understanding of the embodiments of the present disclosure, an Access Control List (ACL) related to the present disclosure is described.

ACL is a packet filtering-based access control technique that filters packets on an interface and allows them to pass or discard them based on set conditions.

An ACL includes several Access Control List Entries (ACLE). A structure of each ACLE is shown in Table 1 below.

TABLE 1

| Id | Name | Type | Description |
|---|---|---|---|
| 0 | Privilege | Enum | The privilege level granted for this entry |
| 1 | AuthMode | AuthMode | Authentication type, describing the type of secure channel authentication method applied by the subject of the entry |
| 2 | Subjects | List [SubjectId] | List of source subjects to which the entry is applied |
| 3 | Targets | List [TargetStruct] | A list of the target clusters which applies the entry applies. |
| 4 | Extension | Octet string | An optional extension load used for cryptographic signatures, vendor-specific ACL content, or other metadata |

In particular, in Table 1 mentioned above, "subject" primarily means to be a source of the operation described in a given authentication method provided by the secure channel architecture. The subject shall be the following.

1. A kind of initiator node that interacts through a Password Authenticated Session Establishment (PASE) session during a commissioning phase, implicitly identified by the fact that the two peers in the PASE session authenticate each other locally.

2. An initiator node that interacts through a Certificate Authenticated Session Establishment (CASE) session during the operational phase, identified by a distinguishable name (e.g., a node ID) from an operational certificate (OpCert) shared during the session establishment.

3. A group, which is an initiator node for interaction through a message group, identified by a group ID and verified by an operational group key.

The technical solutions in the embodiments of the present disclosure may be applied to various communication systems, such as WiFi, BLE, Wireless Local Area Networks (WLAN), mobile communication networks, Near Field Communication (NFC) networks, Ultra Broadband (UWB) networks, infrared networks, microwave communication networks, millimeter wave communication networks, and free space optical communication networks. Embodiments of the present disclosure may also be applied to Device to Device (D2D) communication, Machine to Machine (M2M) communication, Machine Type Communication (MTC), Vehicle to Vehicle (V2V) communication, or Vehicle to everything (V2X) communication, etc.

Figure 2:
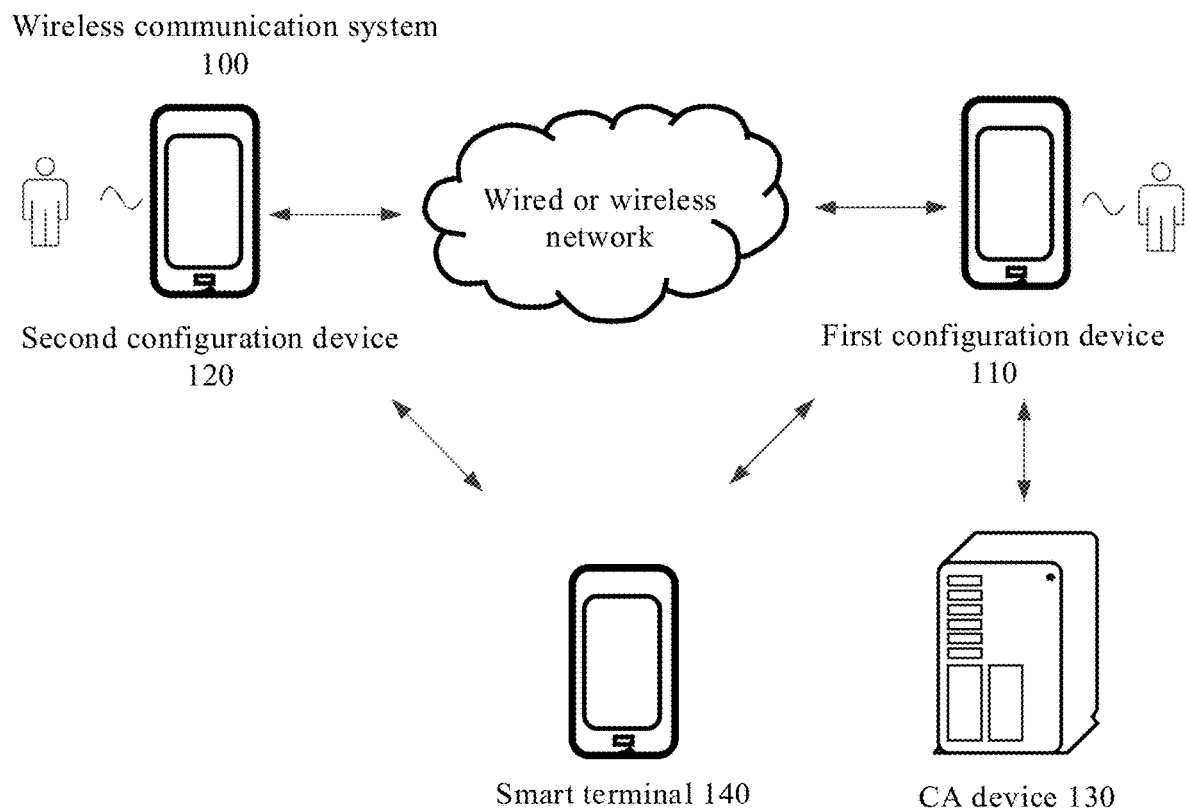
FIG. 2 is a schematic diagram of a wireless communication system according to some embodiments of the present disclosure.

FIG. 2 is a schematic diagram of a wireless communication system according to some embodiments of the present disclosure. As shown in FIG. 2, a wireless communication system 100 may include: a first configuration device 110, a second configuration device 120, a CA device 130, and a smart terminal 140.

In some embodiments, the first configuration device 110 and/or the second configuration device 120 may be a terminal device, such as a cellular phone, a tablet computer, a computer, a Wireless Local Loop (WLL) station, a Personal Digital Assistant (PDA) device, a handheld device with a wireless communication function, computing devices or other processing devices connected to a wireless modem, in-vehicle devices, smart wearable devices, etc.

In some embodiments, the first configuration device 110 and/or the second configuration device 120 may also be server(s).

In some embodiments, the first configuration device 110 and the second configuration device 120 may belong to different Fabric.

In some embodiments, the second configuration device 120 and the smart terminal 140 belong to the same Fabric, and the second configuration device 120 has access privileges (e.g., administrator privileges) for the smart terminal 140, through which the second configuration device 120 may access and control the smart terminal 140.

In some embodiments, the first configuration device 110 and the second configuration device 120 may be connected by wired or wireless means, and the first configuration device 110 may share the access privileges for the smart terminal 140 to the second configuration device 120.

In some embodiments, the smart terminal 140 is at least connected to the second configuration device 120 by wired or wireless means. The smart terminal 140 may be any of the above-described terminal devices, and moreover, the smart terminal 140 may be a smart home product such as a smart refrigerator, a smart bulb, a smart washing machine, a smart TV, a smart wearable device, etc.

In some embodiments, the wearable device may also be referred to as a wearable smart terminal, which is a general term for applying wearable technology to smartly design and develop wearable devices for daily wear, such as eyeglasses, gloves, watches, apparel, and shoes. A wearable device is a portable device that is worn directly on the body or integrated into the user's clothing or accessories. The wearable device is not only a hardware device, but also realizes powerful functions through software support as well as data interaction and cloud interaction. Broadly speaking, wearable smart terminals include full-featured, large-sized smart terminals that may not rely on a smartphone to realize complete or partial functions, such as smart watches or smart glasses, etc., and also include terminals that only focus on a certain type of application function and need to be used in conjunction with other devices, for example, smartphones, such as various types of smart bracelets and smart jewelry that perform physical signs monitoring.

In some embodiments, the smart terminal 140 may also be connected to a first configuration device 110 by wired or wireless means, which has access privileges for the smart terminal 140, and the first configuration device 110 may access and control the smart terminal 140 through the access privileges.

In some embodiments, the CA 130 may be a device with certificate authorization privileges. The CA 130 is connected to the first configuration device 110 by wired or wireless means, and the CA 130 may generate a corresponding application certificate for the first configuration device 110 or update the application certificate through interaction.

In some embodiments, the number of the smart terminals 140 may be one or more, which is not limited.

The technical solutions of the present disclosure are detailed below through some embodiments.

Figure 3:
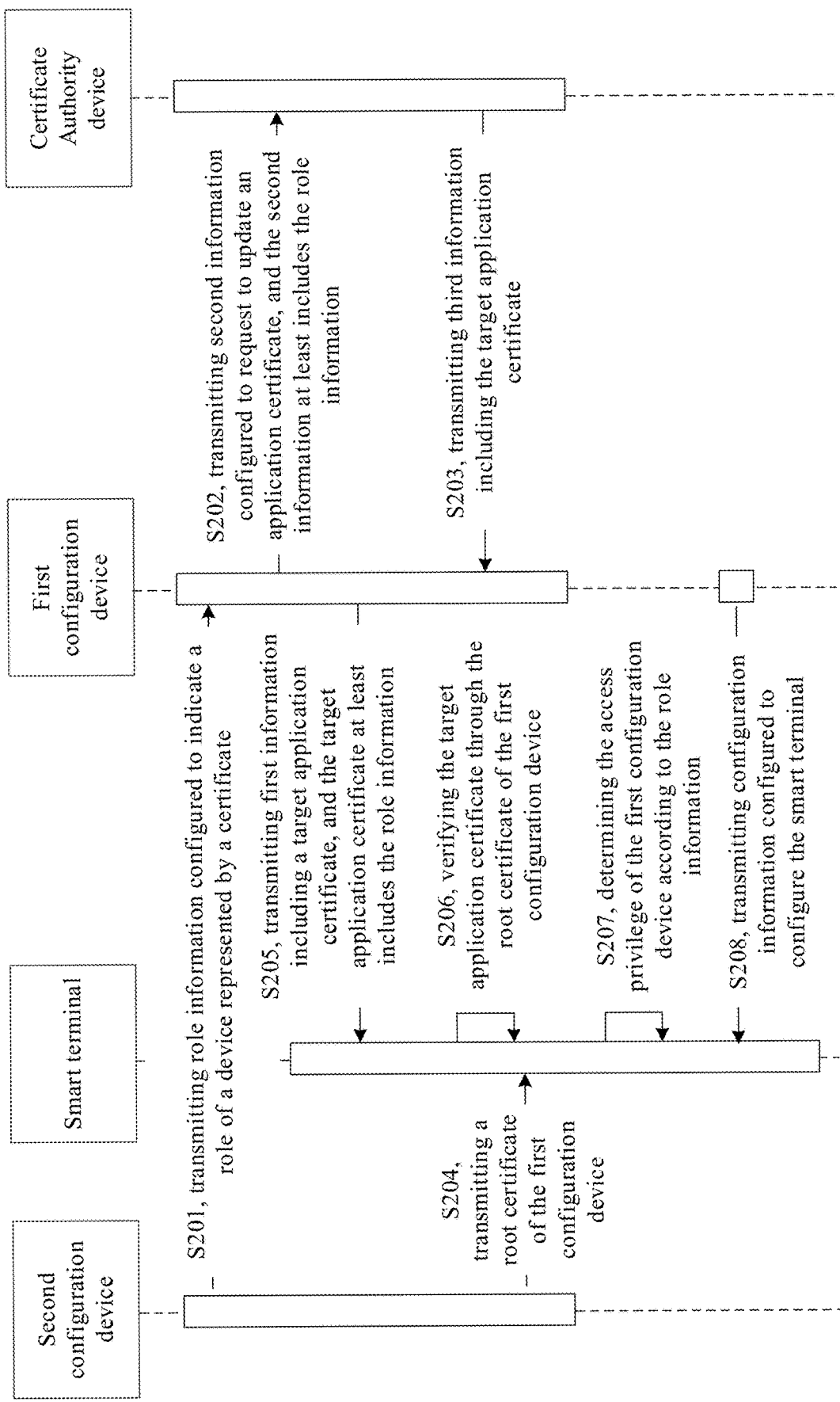
FIG. 3 is a schematic interaction flowchart of a wireless communication method according to some embodiments of the present disclosure.

FIG. 3 is a schematic interaction flowchart of a wireless communication method 200 according to some embodiments of the present disclosure. As shown in FIG. 3, the wireless communication method 200 may at least include following operations.

At operation S201, a second configuration device transmits role information to a first configuration device, and the role information is configured to indicate a role of a device represented by a certificate.

Correspondingly, the first configuration device receives the role information transmitted by the second configuration device.

At operation S205, the first configuration device transmits first information to a smart terminal, the first information includes a target application certificate, and the target application certificate at least includes the role information.

It should be noted that a role of each configuration device relative to the smart terminal may be reflected in a certificate corresponding to the configuration device. For example, the role may be an administrator role with an administrator privilege, and role information may be configured to indicate a role that the configuration device, represented by the certificate, has for the smart terminal. In some embodiments, each configuration device may have a same privilege for a plurality of smart terminals, or may have different privileges for a plurality of smart terminals.

In some embodiments, the second configuration device may directly transmit the role information to the first configuration device. In some embodiments, the second configuration device may transmit a Node Operational Certificate (NOC) certificate including the role information to the first configuration device, such that the first configuration device may read the role information from the NOC certificate.

In some embodiments, the first configuration device may transmit a request to the smart terminal to establish a connection, and transmit the first information carrying the target application certificate to the smart terminal after the connection is established.

The target application certificate is a certificate corresponding to the first configuration device, and the role information in the target application certificate is configured to indicate a role of the first configuration device.

In some embodiments, the target application certificate is configured for the smart terminal to determine an access privilege of the first configuration device.

As shown in FIG. 3, before the first configuration device transmits the first information to the smart terminal, or before the first configuration device establishes the connection with the smart terminal, the wireless communication method 200 may also include at least some of following operations.

At operation S202, the first configuration device transmits second information to the CA device, the second information is configured to request to update an application certificate, and the second information at least includes the role information.

At operation S203, the CA device transmits third information to the first configuration device, and the third information includes the target application certificate.

At operation S204, the second configuration device transmits a root certificate of the first configuration device to the smart terminal.

Some embodiments of the present disclosure do not limit a sequence of operations S204 and S202 or S203.

For operations S202 and S203, a description is as follows.

In order to make an application certificate of the second configuration device include the role information, the second configuration device needs to request the CA device to update the first application certificate to the target application certificate with the role information. In some embodiments, the CA device may add the role information to the first application certificate according to the second information, and may sign the first application certificate with the role information to acquire the target application certificate.

In some embodiments, the second information may also include the first application certificate.

In some embodiments, the second configuration device configures the root certificate of the first configuration device to the smart terminal, such that the smart terminal treats the root certificate of the first configuration device as the trusted root certificate.

As shown in FIG. 3, after the first configuration device transmits the first information to the smart terminal, the wireless communication method 200 may also include at least some of following operations.

At operation S206, the smart terminal verifies the target application certificate through the root certificate of the first configuration device.

At operation S207, the smart terminal determines the access privilege of the first configuration device according to the role information.

At operation S208, the first configuration device transmits configuration information to the smart terminal, and the configuration information is configured to configure the smart terminal.

For operation S207, a description is as follows.

The smart terminal may read the role information from the target application certificate, and determine the access privilege of the first configuration device according to the read role information.

As an example rather than a restrictive explanation, the smart terminal may query an ACLE corresponding to the role information in an ACL, and determine the access privilege of the first configuration device according to the ACLE.

It should be noted that the smart terminal is pre-configured with an ACL including several ACLEs, and role information, for example, a role identifier (ID), is added to the "Subjects" attribute of the ACLE in some embodiments, as shown in Table 2.

TABLE 2

| Id | Name | Type | Description |
| --- | --- | --- | --- |
| 0 | Privilege | Enum | The privilege level granted for this entry |
| 1 | AuthMode | AuthMode | Authentication type, describing the type of secure channel authentication method applied by the subject of the entry |
| 2 | Subjects | List [SubjectId] | List of source subjects to which the entry is applied |
| 3 | Targets | List [TargetStruct] | A list of the target clusters which applies the entry applies. |
| 4 | Extension | Octet string | An optional extension load used for cryptographic signatures, vendor-specific ACL content, or other metadata |

As shown in Table 2, the access privilege of the first configuration device may be determined by the smart terminal from privileges in the ACLE.

In some embodiments, the smart terminal may verify the target application certificate through a public key in the root certificate of the first configuration device, and execute the operation S207 after the verification is passed.

In some embodiments, the configuration information transmitted from the first configuration device to the smart terminal may be configured to implement the first configuration device's access privilege for the smart terminal. For example, the first configuration device sets the smart terminal, reads information of the smart terminal, and controls the smart terminal to perform corresponding operations, etc.

Therefore, in some embodiments of the present disclosure, the second configuration device may share the role information with the first configuration device, such that the first configuration device may acquire the access privilege for the smart terminal through the role information. In this process, only the role information of the second configuration device is transmitted, avoiding information leakage of the Fabric where the first configuration device is located. In addition, the first configuration device only acquires the access privilege indicated by the role information, avoiding expanding privileges of the first configuration device.

In some embodiments of the present disclosure, the role information transmitted by the second configuration device and received by the first configuration device may include different contents. The following describes different implementations where the role information includes different contents through some embodiments.

Figure 4:
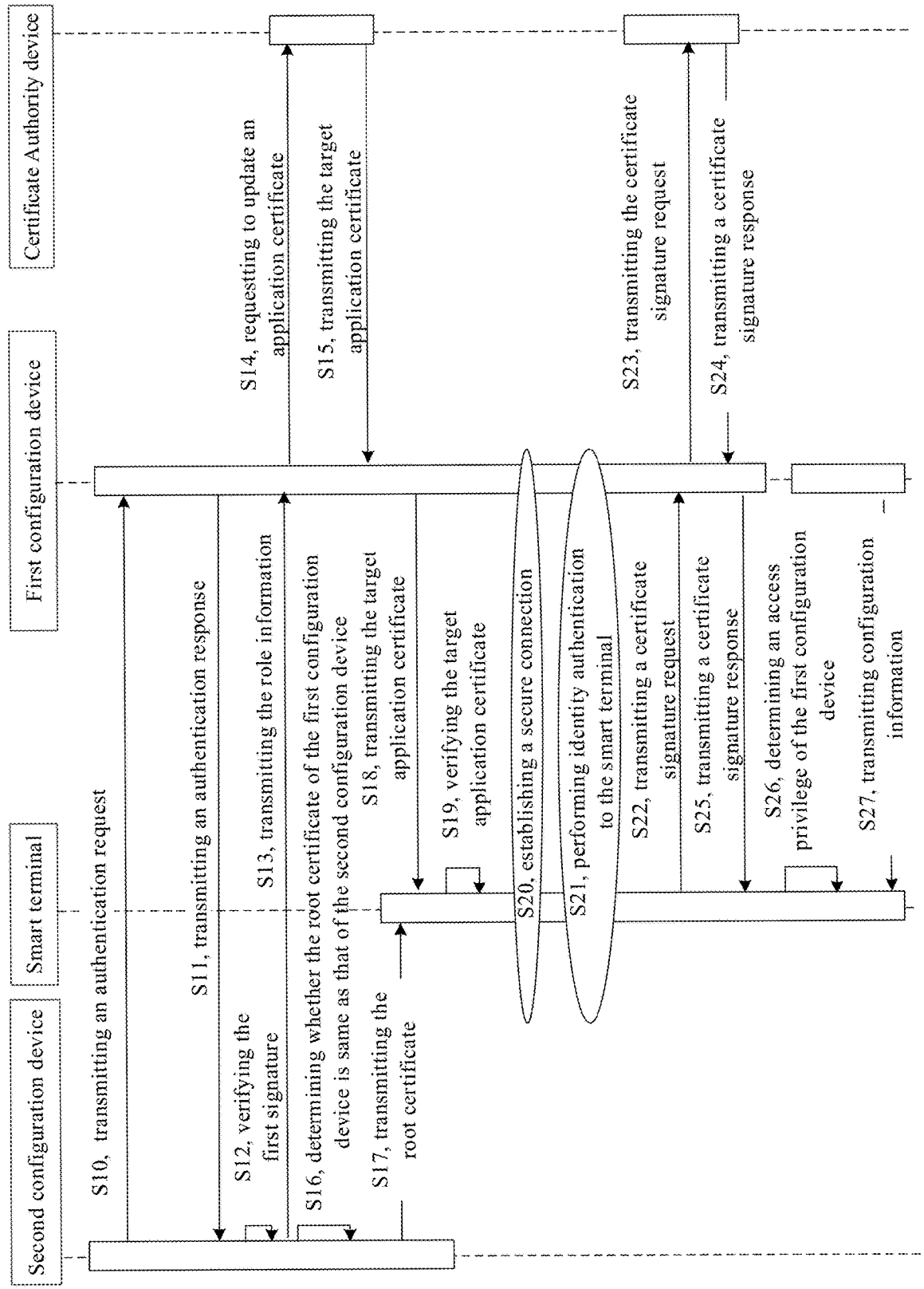
FIG. 4 is a schematic interaction flowchart of a wireless communication method according to some embodiments of the present disclosure.

In a first embodiment, the role information includes a role ID. As shown in FIG. 4, privilege sharing may be implemented through at least some operations at S10-S27 below.

At operation S10, the second configuration device transmits an authentication request to the first configuration device.

At operation S11, the first configuration device transmits an authentication response to the second configuration device.

At operation S12, the second configuration device verifies a first signature in the authentication response.

At operation S13, the second configuration device transmits the role information to the first configuration device.

At operation S14, the first configuration device requests a CA device to update an application certificate.

At operation S15, the CA device transmits a target application certificate to the first configuration device.

At operation S16, the second configuration device determines whether a root certificate of the first configuration device is same as a root certificate of the second configuration device.

At operation S17, the second configuration device transmits the root certificate of the first configuration device to the smart terminal.

At operation S18, the first configuration device transmits the target application certificate to the smart terminal.

At operation S19, the smart terminal verifies the target application certificate through the root certificate of the first configuration device.

At operation S20, the first configuration device establishes a secure connection with the smart terminal.

At operation S21, the first configuration device performs identity authentication to the smart terminal.

At operation S22, the smart terminal transmits a certificate signature request to the first configuration device.

At operation S23, the first configuration device transmits the certificate signature request of the smart terminal to the CA device.

At operation S24, the CA device transmits a certificate signature response of the smart terminal to the first configuration device.

At operation S25, the first configuration device transmits the certificate signature response of the smart terminal to the smart terminal.

At operation S26, the smart terminal determines an access privilege of the first configuration device according to the role information from the target application certificate.

At operation S27, the first configuration device transmits configuration information to the smart terminal, the configuration information is configured to configure the smart terminal.

In some implementations of the first embodiment, the role ID may be roleID(11111111).

In some implementations of the first embodiment, for operations S10 to S12, a description is as follows.

The first configuration device receives the authentication request transmitted by the second configuration device, and the authentication request includes a first random number. Further, the first configuration device transmits the authentication response to the second configuration device, and the authentication response includes a root certificate, a first application certificate, and a first signature of the first configuration device. The first application certificate is an application certificate of the first configuration device before being updated, and the first signature is acquired as the first configuration device signs the first random number using its private key.

In some implementations of the first embodiment, the second configuration device may verify the first application certificate through the root certificate of the first configuration device, and further, verify the first signature through the first application certificate. Operation S13 is performed after the first signature is verified.

In some implementations of the first embodiment, for operation S16, it should be noted that when the root certificates of the second configuration device and the first configuration device are same, it means that they belong to a same Fabric. When the root certificates of the second configuration device and the first configuration device are different, it means that they belong to different Fabrics. It should be understood that when the second configuration device and the first configuration device belong to different Fabrics, the second configuration device needs to add the root certificate of the first configuration device to the smart terminal as the trusted root certificate.

In some implementations of the first embodiment, for operations S20 to S25, a description is as follows.

After the first configuration device passes the identity authentication of the smart terminal, the smart terminal transmits the certificate signature request to the first configuration device, the certificate signature request is configured to request the CA device corresponding to the first configuration device to sign the certificate of the smart terminal. The first configuration device relays the certificate signature request to the CA device. After the CA device signs the certificate of the smart terminal, the CA transmits the certificate signature response of the smart terminal to the first configuration device. The certificate signature response includes the signed certificate of the smart terminal. The first configuration device relays the certificate signature response or the signed certificate to the smart terminal.

In some implementations of the first embodiment, the first configuration device requests the CA device to update the application certificate, so as to update the first application certificate to the target application certificate. In this embodiment, the first application certificate may be, for example:

```
{
  Certificate:
    Data:
      Version: 3 (0x2)
      Serial Number:
        13:bd:9b:c5:ae:fc:ef:ab:42:af:4d:2b:fa:90:11:e2:79:6d:b6:d8
      Signature Algorithm: ecdsa-with-SHA256
      Issuer: CN = CHIP GOOGLE ICA
      Validity
        Not Before: Mar 14 10:11:24 2021 GMT
        Not After: Aug 14 12:11:24 2022 GMT
      Subject: CN = d8efdf7efe7aecbd
      Subject Public Key Info:
        Public Key Algorithm: id-ecPublicKey
          Public-Key: (256 bit)
          pub:
            04:6e:ef:53:5a:7c:f3:......
          ASN1 OID: prime256v1
          NIST CURVE: P-256
      X509v3 extensions:
        X509v3 Basic Constraints: critical
          CA:FALSE
        X509v3 Authority Key Identifier:
          keyid:CFW:89:35:2A:7B:4F:62:FE:...
        X509v3 Extended Key Usage:
          TLS Web Client Authentication, TLS Web Server Authentication
```

```
    X509v3 Subject Key Identifier:
        F7:39:B1:D0:39:5A:F3:38:8F:.......
    X509v3 Key Usage: critical
        Digital Signature, Key Encipherment
    X509v3 Subject Alternative Name:
        CN = 9dd7d8d3
Signature Algorithm: ecdsa-with-SHA256
    13:55:93:9d:89:c5:2f:87:
}
```

The updated target application certificate may be, for example:

```
{
  Certificate:
  Data:
    Version: 3 (0x2)
    Serial Number:
        13:bd:9b:c5:ae:fc:ef:ab:42:af:4d:2b:fa:90:11:e2:79:6d:b6:d8
    Signature Algorithm: ecdsa-with-SHA256
    Issuer: CN = CHIP GOOGLE ICA
    Validity
        Not Before: Mar 14 10:11:24 2021 GMT
        Not After: Aug 14 12:11:24 2022 GMT
    Subject: CN = d8efdf7efe7aecbd
    Subject Public Key Info:
        Public Key Algorithm: id-ecPublicKey
            Public-Key: (256 bit)
            pub:
                04:6e:ef:53:5a:7c:f3:......
            ASN1 OID: prime256v1
            NIST CURVE: P-256
    X509v3 extensions:
        X509v3 Basic Constraints: critical
            CA:FALSE
        X509v3 Authority Key Identifier:
            keyid:CFW:89:35:2A:7B:4F:62:FE:...
        X509v3 Extended Key Usage:
            TLS Web Client Authentication, TLS Web Server Authentication
        X509v3 Subject Key Identifier:
            F7:39:B1:D0:39:5A:F3:38:8F:......
        X509v3 Key Usage: critical
            Digital Signature, Key Encipherment
        X509v3 Subject Alternative Name:
            CN = 9dd7d8d3
            CN = 11111111
    Signature Algorithm: ecdsa-with-SHA256
        e5:92:44:9f:87:c3:5d:b2:........
}
```

In some implementations of the first embodiment, operations S13 to S15, S17 to S19, S26, and S27 are similar to operations S201 to S208 shown in FIG. 3, respectively, which are not repeated here.

In some implementations of the first embodiment, a sequence of performing any operation in S18 and S19 to S25 is not required. That is, operation S18 may be performed before operation S19, or after operation S25, or during performing operations S19 to S25.

Figure 5:
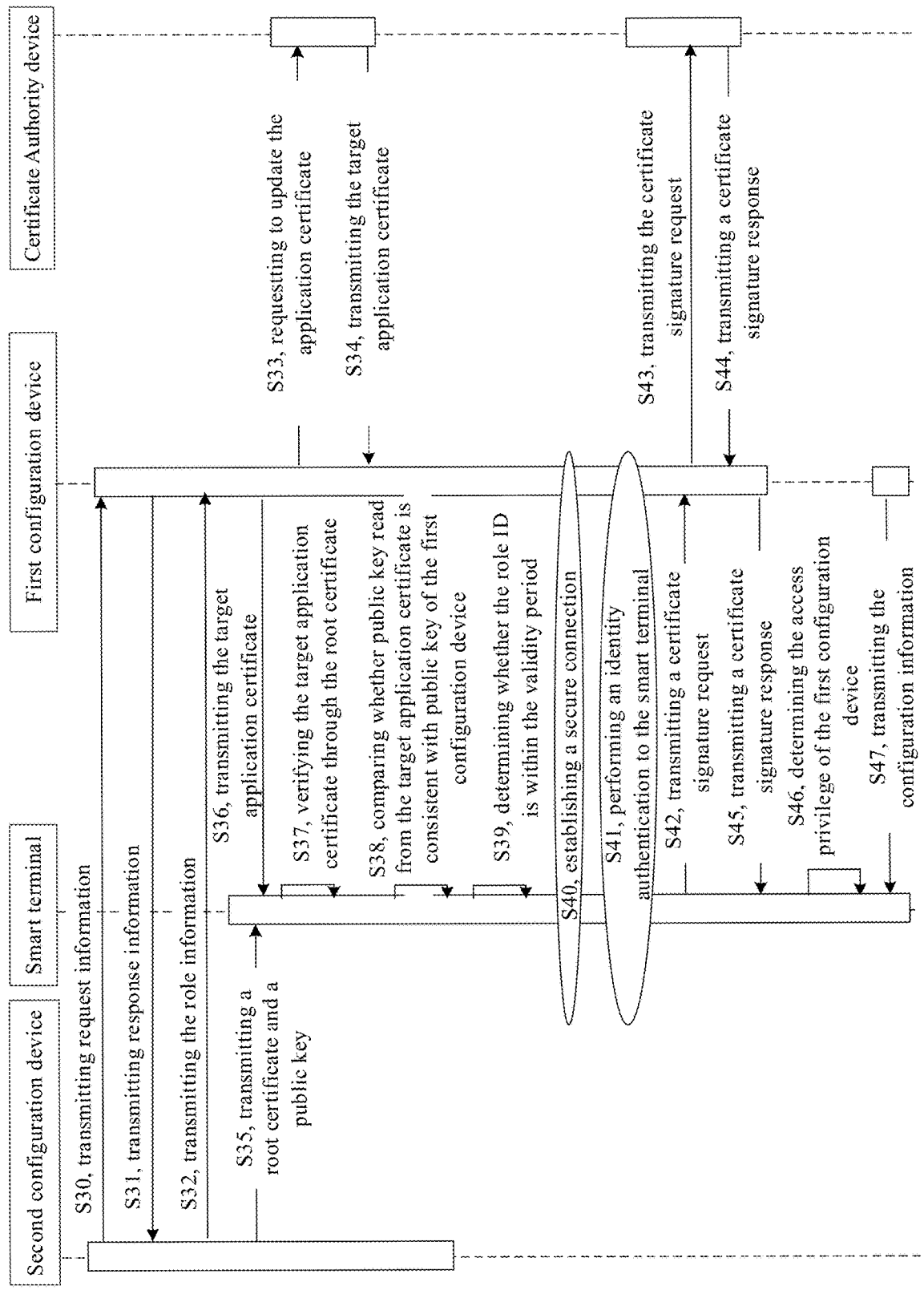
FIG. 5 is a schematic interaction flowchart of another wireless communication method according to some embodiments of the present disclosure.

In a second embodiment, the role information includes a role ID, a validity period of the role ID, and a first target signature. The first target signature is a signature which a device sharing the role information generates for the role ID and the validity period of the role ID using its private key. As shown in FIG. 5, the privilege sharing may be implemented through at least some operations in S30-S47.

At operation S30, the second configuration device transmits request information to the first configuration device.

At operation S31, the first configuration device transmits response information to the second configuration device.

At operation S32, the second configuration device transmits the role information to the first configuration device.

At operation S33, the first configuration device requests the CA device to update an application certificate.

At operation S34, the CA device transmits a target application certificate to the first configuration device.

At operation S35, the second configuration device transmits a root certificate and a public key of the first configuration device to the smart terminal.

At operation S36, the first configuration device transmits the target application certificate to the smart terminal.

At operation S37, the smart terminal verifies the target application certificate through the root certificate of the first configuration device.

At operation S38, the smart terminal compares whether the public key read from the target application certificate is consistent with the public key of the first configuration device.

At operation S39, the smart terminal determines whether the role ID is within the validity period thereof.

At operation S40, the first configuration device establishes a secure connection with the smart terminal.

At operation S41, the first configuration device performs identity authentication to the smart terminal.

At operation S42, the smart terminal transmits a certificate signature request to the first configuration device.

At operation S43, the first configuration device transmits the certificate signature request of the smart terminal to the CA device.

At operation S44, the CA device transmits a certificate signature response of the smart terminal to the first configuration device.

At operation S45, the first configuration device transmits the certificate signature response of the smart terminal to the smart terminal.

At operation S46, the smart terminal determines an access privilege of the first configuration device according to the role information from the target application certificate.

At operation S47, the first configuration device transmits configuration information to the smart terminal, the configuration information is configured to configure the smart terminal.

In some implementations of the second embodiment, the role information may be structured data, for example, the role ID is 11111111, the validity period is 03/15/2021-03/16/2021, a signature generated for the role ID and the validity period of role ID using the private key of the second configuration device is a89da7f8 . . . , such that the role information may be represented as 1111111103152103120 21a89da7f8 . . . .

In some implementations of the second embodiment, for operations S30 and S31, a description is as follows.

The first configuration device receives the request information transmitted by the second configuration device, the request information is configured to request a root certificate and a public key of the first configuration device. The first configuration device transmits the response information to the second configuration device, the response information includes the root certificate and the public key of the first configuration device.

In some implementations of the second embodiment, for operation S35, a description is as follows.

The second configuration device may transmit the root certificate and public key of the first configuration device to the smart terminal at a same time or separately. For example, before operation S37, the smart terminal transmits the root certificate of the first configuration device, and before operation S38, the smart terminal transmits the public key of the first configuration device, which are not limited.

In some implementations of the second embodiment, the smart terminal receives the public key of the first configuration device transmitted by the second configuration device, and the second configuration device is a device sharing the role information.

In some implementations of the second embodiment, for operation S38, a description is as follows.

The smart terminal compares whether the public key from the target application certificate is consistent with the public key of the first configuration device. In response to these public keys being consistent with each other, the smart terminal determines the access privilege of the first configuration device according to the role information. In response to these public keys being consistent with each other, operation S39 may be performed.

In some implementations of the second embodiment, for operation S39, a description is as follows.

In response to the role ID being within the validity period, the smart terminal determines the access privilege of the first configuration device according to the role information.

In some implementations of the second embodiment, the smart terminal may decrypt the first target signature through the public key of the second configuration device and acquire the role ID and the validity period corresponding to the first target signature. The second configuration device is a device sharing the role information. The smart terminal verifies the role ID and the validity period from the target application certificate according to the role ID and the validity period corresponding to the first target signature. In response to the role ID and the validity period from the target application certificate being true, the smart terminal determines the access privilege of the first configuration device according to the role information.

In some implementations of the second embodiment, the smart terminal may query the second configuration device according to the role ID from the target application certificate, and acquire a public key of the second configuration device.

In some implementations of the second embodiment, the first configuration device requests the CA device to update the application certificate, so as to update the first application certificate to the target application certificate. In this embodiment, the target application certificate may be, for example:

```
{
  Certificate:
  Data:
    Version: 3 (0x2)
    Serial Number:
      13:bd:9b:c5:ae:fc:ef:ab:42:af:4d:2b:fa:90:11:e2:79:6d:b6:d8
    Signature Algorithm: ecdsa-with-SHA256
    Issuer: CN = CHIP GOOGLE ICA
    Validity
      Not Before: Mar 14 10:11:24 2021 GMT
      Not After: Aug 14 12:11:24 2022 GMT
    Subject: CN = d8efdf7efe7aecbd
    Subject Public Key Info:
      Public Key Algorithm: id-ecPublicKey
        Public-Key: (256 bit)
        pub:
          04:6e:ef:53:5a:7c:f3:......
        ASN1 OID: prime256v1
        NIST CURVE: P-256
```

```
X509v3 extensions:
    X509v3 Basic Constraints: critical
        CA:FALSE
    X509v3 Authority Key Identifier:
        keyid:CFW:89:35:2A:7B:4F:62:FE:...
    X509v3 Extended Key Usage:
        TLS Web Client Authentication, TLS Web Server Authentication
    X509v3 Subject Key Identifier:
        F7:39:B1:D0:39:5A:F3:38:8F:........
    X509v3 Key Usage: critical
        Digital Signature, Key Encipherment
    X509v3 Subject Alternative Name:
        CN = 9dd7d8d3
        CN = 11111111031520210316202la89da7f8......
Signature Algorithm: ecdsa-with-SHA256
    e5:92:44:9f:87:c3:5d:b2:........
}
```

In some implementations of the second embodiment, operations S32 to S34, S36, S37, S46, and S47 are similar to operations S201 to S203, S205 to S208 shown in FIG. 3, respectively, which are not repeated here.

In some implementations of the second embodiment, operations S40 to S45 are similar to operations S20 to S25 shown in FIG. 4, respectively, which are not repeated here.

In a third embodiment, the role information includes a role ID, an ID of the first configuration device, a validity period of the role ID, and a second target signature. The second target signature is a signature which a device sharing the role information generates for the role ID, the ID of the first configuration device, and the validity period of the role ID using its private key.

Some implementations of the third embodiment also include at least some operations shown in FIG. 5.

As shown in FIG. 5, in some implementations of the third embodiment, operations S30, S31, and S35 are similar to that in the second embodiment, which are not repeated here.

In some implementations of the third embodiment, for operation S38, a description is as follows.

The smart terminal compares whether the public key from the target application certificate is consistent with the public key of the first configuration device. In response to these public keys being consistent with each other, the smart terminal determines the access privilege of the first configuration device according to the role information.

In some implementations of the third embodiment, for operation S39, a description is as follows.

In response to the role ID being within the validity period, the smart terminal determines the access privilege of the first configuration device according to the role information.

In some implementations of the third embodiment, the smart terminal may decrypt the second target signature through the public key of the second configuration device and acquire the role ID, the validity period, and the ID of the first configuration device corresponding to the second target signature. The second configuration device is a device sharing the role information. The smart terminal verifies the role ID, the validity period, and the ID of the first configuration device from the target application certificate according to the role ID, the validity period, and the ID of the first configuration device corresponding to the second target signature. In response to the role ID, the validity period, and the ID of the first configuration device from the target application certificate being true, the smart terminal determines the access privilege of the first configuration device according to the role information.

In some implementations of the third embodiment, the smart terminal may query the second configuration device according to the role ID from the target application certificate, and acquire a public key of the second configuration device.

In some implementations of the third embodiment, the smart terminal may decrypt the second target signature through the public key of the second configuration device and acquire the role ID and/or the ID of the first configuration device corresponding to the second target signature. The second configuration device is a device sharing the role information. The smart terminal compares whether the role ID and/or the ID of the first configuration device corresponding to the second target signature is consistent with the role ID from the target application certificate and/or the ID of the first configuration device from the target application certificate. In response to they being consistent with each other, the smart terminal determines the access privilege of the first configuration device according to the role information.

In some implementations of the third embodiment, operations S32 to S34, S36, S37, S46, and S47 are similar to operations S201 to S203, S205 to S208 shown in FIG. 3, respectively, which are not repeated here.

Operations S40 to S45 in this embodiment are similar to operations S20 to S25 in the embodiment shown in FIG. 4 above, respectively, which are not repeated here.

In a fourth embodiment, the role information includes a role ID, an ID of the first configuration device, and a third target signature. The third target signature is a signature which a device sharing the role information generates for the role ID and the ID of the first configuration device using its private key.

Some implementations of the fourth embodiment include at least some operations other than operation S39 shown in FIG. 5.

As shown in FIG. 5, in some implementations of the fourth embodiment, operations S30, S31, and S35 are similar to operations in the second embodiment, which are not repeated here.

In some implementations of the fourth embodiment, the smart terminal decrypts the third target signature through the public key of the second configuration device and acquires the role ID and/or the ID of the first configuration device corresponding to the third target signature. The second configuration device is a device sharing the role information. The smart terminal compares whether the role ID and/or the ID of the first configuration device corresponding to the third target signature is consistent with the role ID and/or the ID of the first configuration device from the target application certificate. In response to they being consistent with each other, the smart terminal determines the access privilege of the first configuration device according to the role information.

to operations S201 to S203, S205 to S208 shown in FIG. 3, respectively, which are not repeated here.

In some implementations of the fourth embodiment, operations S40 to S45 are similar to operations S20 to S25 in the embodiment shown in FIG. 4, respectively, which are not repeated here.

In some embodiments, the role information is added into the NOC certificate of the second configuration device, for example, a role ID (11111111) is added to acquire the NOC certificate with the role information. The second configuration device may transmit the NOC certificate to the first configuration device such that the first configuration device read the role information of the second configuration device.

In some embodiments, the NOC certificate with the role information may be:

```
{
  Certificate:
  Data:
    Version: 3 (0x2)
    Serial Number:
      13:bd:9b:c5:ae:fc:ef:ab:42:af:4d:2b:fa:90:11:e2:79:6d:b6:d8
    Signature Algorithm: ecdsa-with-SHA256
    Issuer: CN = CHIP APPLE ICA
    Validity
      Not Before: Aug 14 10:11:24 2020 GMT
      Not After: Aug 14 12:11:24 2021 GMT
    Subject: CN = 1e4583fbf22af50b
    Subject Public Key Info:
      Public Key Algorithm: id-ecPublicKey
        Public-Key: (256 bit)
        pub:
          04:84:b2:59:e4:53:d5:......
        ASN1 OID: prime256v1
        NIST CURVE: P-256
    X509v3 extensions:
      X509v3 Basic Constraints: critical
        CA:FALSE
      X509v3 Authority Key Identifier:
        keyid: 9E:6F:44:AA:8D:FB:62:5B:...
      X509v3 Extended Key Usage:
        TLS Web Client Authentication, TLS Web Server Authentication
      X509v3 Subject Key Identifier:
        F9:59:A1:A0:39:9A:A3:05:6F:......
      X509v3 Key Usage: critical
        Digital Signature, Key Encipherment
      X509v3 Subject Alternative Name:
        CN = 11111111
    Signature Algorithm: ecdsa-with-SHA256
      30:45:02:21:00:a9:6e:6f:......
}
```

In some implementations of the fourth embodiment, for operation S38, a description is as follows.

The smart terminal compares whether the public key from the target application certificate is consistent with the public key of the first configuration device. In response to these public keys being consistent with each other, the smart terminal determines the access privilege of the first configuration device according to the role information.

In some implementations of the fourth embodiment, operations S32 to S34, S36, S37, S46, and S47 are similar Further, after the connection between the first configuration device and the second configuration device is established through a bilateral authentication, the first configuration device queries a matched ACLE in an ACL according to the roleID (11111111) declared by the NOC certificate of the second configuration device, for example:

```
{
  Privilege = Administrator,   // Administrator privileges
  AuthMode  = CASE,
  Subjects = 11111111,
  Targets = NULL              // Targets being empty means matching all Targets
}
```

The ACLE represents that the role ID (11111111) has an administrator privilege of a device. The first configuration device allows the second configuration device to perform corresponding operations on the first configuration device.

The above describes some method embodiments of the present disclosure in detail with reference to FIGS. 3 to 5. The following describes some apparatus embodiments of the present disclosure in detail with reference to FIGS. 6 to 10. It should be understood that the apparatus embodiments and the method embodiments correspond to each other, and similar descriptions may refer to the method embodiments.

Figure 6:
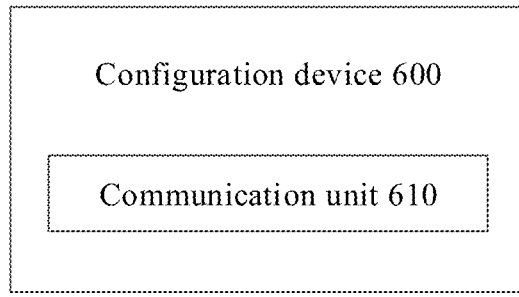
FIG. 6 is a schematic block diagram of a configuration device according to some embodiments of the present disclosure.

FIG. 6 is a schematic block diagram of a configuration device 600 according to some embodiments of the present disclosure. As shown in FIG. 6, the configuration device 600 includes following units, a communication unit 610 configured to receive role information configured to indicate a role of a device represented by a certificate. The communication unit 610 is also configured to transmit first information to the smart terminal, the first information includes a target application certificate, and the target application certificate at least includes the role information.

In some embodiments, the target application certificate is configured for the smart terminal to determine an access privilege of the first configuration device.

In some embodiments, the communication unit 610 is also configured to transmits second information to the CA device, the second information is configured to request to update an application certificate, and the second information at least includes the role information. The communication unit 610 is also configured to receive third information transmitted by the CA device, and third information includes the target application certificate.

In some embodiments, the second information also includes a first application certificate which is an application certificate of the first configuration device before being updated.

In some embodiments, the role information includes a role ID.

In some embodiments, the communication unit 610 is also configured to receive an authentication request transmitted by the second configuration device, and the authentication request includes a first random number. The communication unit 610 is also configured to transmit the authentication response to the second configuration device, and the authentication response includes a root certificate, a first application certificate, and a first signature of the first configuration device. The first application certificate is an application certificate of the first configuration device before being updated, and the first signature is acquired as the first configuration device signs the first random number using its private key.

In some embodiments, the role information includes the role ID, a validity period of the role ID, and a first target signature. The first target signature is a signature which a device sharing the role information generates for the role ID and the validity period of the role ID using its private key.

In some embodiments, the role information includes the role ID, an ID of the first configuration device, the validity period of the role ID, and a second target signature. The second target signature is a signature which a device sharing the role information generates for the role ID, the ID of the first configuration device and the validity period of the role ID using its private key.

In some embodiments, the role information includes the role ID, the ID of the first configuration device, and a third target signature. The third target signature is a signature which a device sharing the role information generates for the role ID and the ID of the first configuration device using its private key.

In some embodiments, the communication unit 610 is also configured to receive request information transmitted by the second configuration device, the request information is configured to request the root certificate and the public key of the first configuration device. The communication unit 610 is also configured to transmit response information to the second configuration device, the response information includes the root certificate and the public key of the first configuration device.

In some embodiments, the communication unit 610 is also configured to transmit the configuration information to the smart terminal, the configuration information is configured to configure the smart terminal.

It should be understood that the configuration device 600 according to some embodiments of the present disclosure may correspond to the first configuration device in some method embodiments of the present disclosure, and the above and other operations and/or functions of various units in the device 600 are configured to implement the corresponding flows of the first configuration device in the methods shown in FIGS. 3 to 5, respectively. For simplicity, they are not repeated here.

Figure 7:
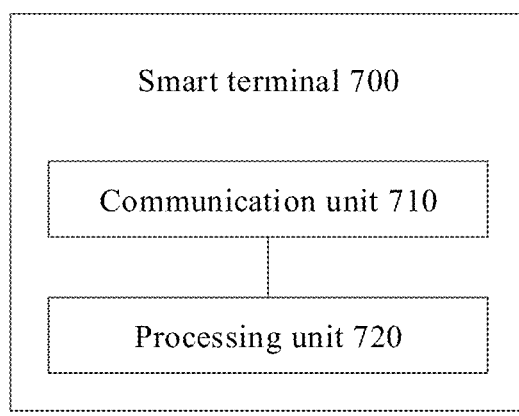
FIG. 7 is a schematic block diagram of a smart terminal according to some embodiments of the present disclosure.

FIG. 7 is a schematic block diagram of a smart terminal according to some embodiments of the present disclosure. As shown in FIG. 7, a smart terminal 700 includes a communication unit 710 configured to receive first information transmitted by a first configuration device, the first information includes a target application certificate, the target application certificate at least includes role information, and the role information is configured to indicate a role of a device represented by a certificate. The smart terminal 700 also includes a processing unit 720 configured to determine an access privilege of the first configuration device according to the role information.

In some embodiments, the processing unit 720 is configured to query an ACLE corresponding to the role information in an ACL, and determine the access privilege of the first configuration device according to the ACLE.

In some embodiments, the role information includes a role ID.

In some embodiments, the role information includes the role ID, a validity period of the role ID, and a first target signature. The first target signature is a signature which a device sharing the role information generates for the role ID and the validity period of the role ID using its private key.

In some embodiments, the role information includes the role ID, an ID of the first configuration device, the validity period of the role ID, and a second target signature. The second target signature is a signature which a device sharing the role information generates for the role ID, the ID of the first configuration device and the validity period of the role ID using its private key.

In some embodiments, the processing unit 720 is configured to: determine the access privilege of the first configuration device according to the role information, in response to the role ID being within the validity period; decrypt the second target signature through the public key of the second configuration device and acquire the role ID, the validity period, and the ID of the first configuration device corresponding to the second target signature, the second configuration device is a device sharing the role information; and verify the role ID, the validity period, and the ID of the first configuration device from the target application certificate according to the role ID, the validity period, and the ID of the first configuration device corresponding to the second target signature.

In some embodiments, the processing unit 720 is configured to: determine the access privilege of the first configuration device according to the role information, in response to the role ID, the validity period, and the ID of the first configuration device from the target application certificate being true; decrypt the second target signature through the public key of the second configuration device and acquire the role ID, the validity period, and the ID of the first configuration device corresponding to the second target signature. The second configuration device is a device sharing the role information; and verify the role ID, the validity period, and the ID of the first configuration device from the target application certificate according to the role ID, the validity period, and the ID of the first configuration device corresponding to the second target signature.

In some embodiments, the processing unit 720 is configured to determine the access privilege of the first configuration device according to the role information, in response to the role ID, the validity period, and the ID of the first configuration device from the target application certificate being true.

In some embodiments, the processing unit 720 is configured to query the second configuration device according to the role ID from the target application certificate, and acquire the public key of the second configuration device.

In some embodiments, the processing unit 720 is configured to: decrypt the second target signature through the public key of the second configuration device and acquire the role ID and/or the ID of the first configuration device corresponding to the second target signature, the second configuration device is a device sharing role information; compare whether the role ID and/or the ID of the first configuration device corresponding to the second target signature is consistent with the role ID from the target application certificate and/or the ID of the first configuration device from the target application certificate; and determine the access privilege of the first configuration device according to the role information, in response to they being consistent with each other.

In some embodiments, the role information includes the role ID, the ID of the first configuration device, and a third target signature. The third target signature is a signature which a device sharing the role information generates for the role ID and the ID of the first configuration device using its private key.

In some embodiments, the processing unit 720 is configured to: decrypt the third target signature through the public key of the second configuration device and acquire the role ID corresponding to the third target signature and/or the ID of the first configuration device corresponding to the third target signature, the second configuration device is a device sharing the role information; compare whether the role ID corresponding to the third target signature and/or the ID of the first configuration device corresponding to the third target signature is consistent with the role ID from the target application certificate and/or the ID of the first configuration device from the target application certificate; and determine the access privilege of the first configuration device according to the role information, in response to they being consistent with each other.

In some embodiments, the processing unit 720 is configured to: compare whether the public key from the target application certificate is consistent with the public key of the first configuration device; and determine the access privilege of the first configuration device according to the role information, in response to these public keys being consistent with each other.

In some embodiments, the processing unit 720 is configured to receive the public key of the first configuration device transmitted by the second configuration device, the second configuration device is a device sharing the role information.

In some embodiments, the processing unit 720 is configured to verify the target application certificate through the root certificate of the first configuration device.

In some embodiments, the processing unit 720 is configured to receive the root certificate of the first configuration device transmitted by the second configuration device, the second configuration device is a device sharing the role information.

It should be understood that the smart terminal 700 according to some embodiments of the present disclosure may correspond to the smart terminal in some method embodiments of the present disclosure, and the above and other operations and/or functions of various units in the smart terminal 700 are configured to implement the corresponding flows of the smart terminal in the methods shown in FIGS. 3 to 5, respectively. For simplicity, they are not repeated here.

Figure 8:
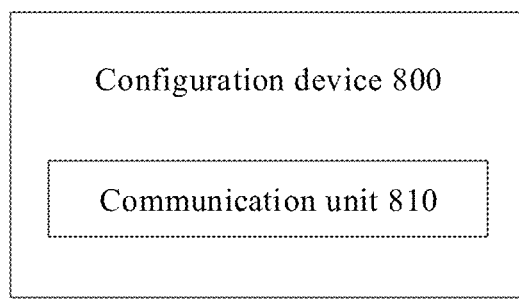
FIG. 8 is a schematic block diagram of a configuration device according to some embodiments of the present disclosure.

FIG. 8 is a schematic block diagram of a configuration device 800 according to some embodiments of the present disclosure. As shown in FIG. 8, the configuration device 800 includes a communication unit 810 configured to transmit role information to a first configuration device, and the role information is configured to indicate a role of a device represented by a certificate.

In some embodiments, the role information includes a role ID.

In some embodiments, the communication unit 810 is also configured to receive the authentication request transmitted by the second configuration device, and the authentication request includes a first random number. The communication unit 810 is also configured to receive the authentication response transmitted by the first configuration device, and the authentication response includes a root certificate, a first application certificate, and a first signature of the first configuration device. The first application certificate is an application certificate of the first configuration device before being updated, and the first signature is acquired as the first configuration device signs the first random number using its private key. In some embodiments, the role information includes the role ID, a validity period of the role ID, and a first target signature. The first target signature is a signature which the second device generates for the role ID and the validity period of the role ID using its private key.

In some embodiments, the role information includes the role ID, an ID of the first configuration device, the validity period of the role ID, and a second target signature. The second target signature is a signature which the second device generates for the role ID, the ID of the first configuration device and the validity period of the role ID using its private key.

In some embodiments, the role information includes the role ID, the ID of the first configuration device, and a third target signature. The third target signature is a signature which the second device generates for the role ID and the ID of the first configuration device using its private key.

In some embodiments, the communication unit 810 is also configured to: transmit request information to the first configuration device, the request information is configured to request the root certificate and the public key of the first configuration device; and receive response information transmitted by the first configuration device, the response information includes the root certificate and the public key of the first configuration device.

In some embodiments, the communication unit 810 is also configured to transmit the public key of the first configuration device to the smart terminal.

In some embodiments, the communication unit 810 is also configured to transmit the root certificate of the first configuration device to the smart terminal.

It should be understood that the configuration device 800 according to some embodiments of the present disclosure may correspond to the second configuration device some method embodiments of the present disclosure, and the above and other operations and/or functions of various units in the device 800 are configured to implement the corresponding flows of the second configuration device in the methods shown in FIGS. 3 to 5, respectively. For simplicity, they are not repeated here.

Figure 9:
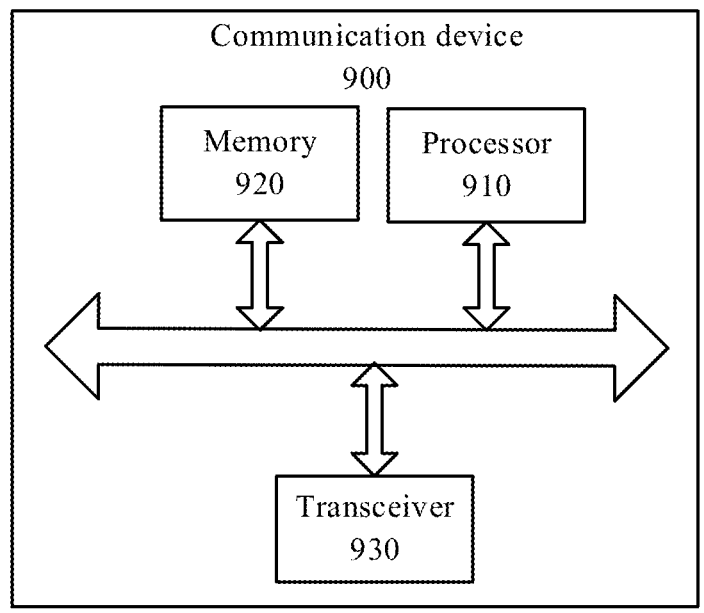
FIG. 9 is a structural schematic diagram of a communication device according to some embodiments of the present disclosure.

FIG. 9 is a schematic structure diagram of a communication device according to some embodiments of the present disclosure. A communication device 900 shown in FIG. 9 includes a processor 910 calling and running a computer program from a memory to implement the methods in some embodiments of the present disclosure.

In some embodiments, as shown in FIG. 9, the communication device 900 may also include a memory 920. The processor 910 may call and run a computer program from the memory 920 to implement the methods in some embodiments of the present disclosure.

The memory 920 may be a separate device independent of the processor 910, or may be integrated in the processor 910.

In some embodiments, as shown in FIG. 9, the communication device 900 may also include a transceiver 930, and the processor 910 may control the transceiver 930 to communicate with other device. The transceiver 930 may transmit information or data to other device, or receive information or data transmitted by another device.

The transceiver 930 may include a transmitter and a receiver. The transceiver 930 may further include antennas, and the number of the antennas may be one or more.

In some embodiments, the communication device 900 may be the first configuration device, the second configuration device, or the smart terminal in some embodiments of the present disclosure, and the communication device 900 may implement the corresponding processes implemented by the first configuration device, the second configuration device, or the smart terminal in various methods of some embodiments of the present disclosure. For simplicity, they are not repeated here.

Figure 10:
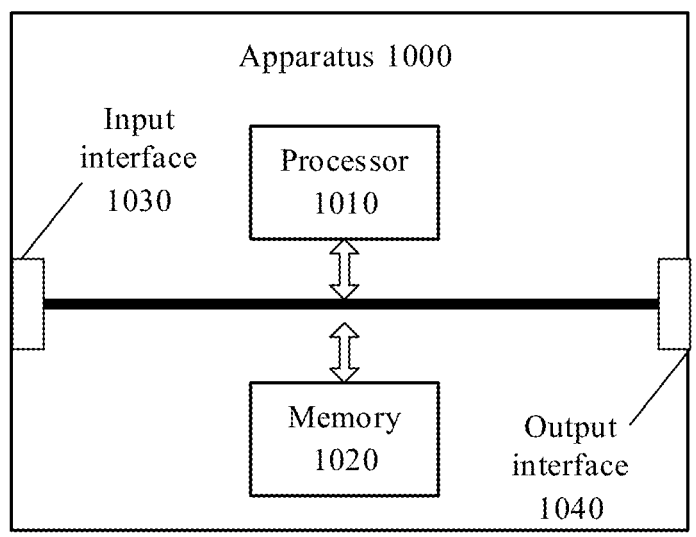
FIG. 10 is a structural schematic diagram of an apparatus according to some embodiments of the present disclosure.

FIG. 10 is a schematic structure diagram of the apparatus according to some embodiments of the present disclosure. An apparatus 1000 shown in FIG. 10 includes a processor 1010 calling and running a computer program from a memory to implement the methods in some embodiments of the present disclosure.

In some embodiments, as shown in FIG. 10, the apparatus 1000 may also include a memory 1020. The processor 1010 may call and run a computer program from the memory 100 to implement the methods in some embodiments of the present disclosure.

The memory 1020 may be a separate device independent of the processor 1010, or may be integrated in the processor 1010.

In some embodiments, the apparatus 1000 may also include an input interface 1030. The processor 1010 may control the input interface 1030 to communicate with other device or chip, the input interface 1030 may acquire information or data transmitted by another device or chip.

In some embodiments, the apparatus 1000 may also include an output interface 1040. The processor 1010 may control the output interface 1040 to communicate with other device or chip, the output interface 1040 may output information or data to another device or chip.

In some embodiments, the apparatus may be applied to the first configuration device, the second configuration device, or the smart terminal in some embodiments of the present disclosure, and the apparatus may implement the corresponding processes implemented by the first configuration device, the second configuration device, or the smart terminal in various methods of some embodiments of the present disclosure. For simplicity, they are not repeated here.

In some embodiments, the apparatus mentioned in some embodiments of the present disclosure may also be a chip. For example, the apparatus may be a system-level chip, a system chip, a chip system, or a system chip on chip.

It should be understood that the processor in some embodiments of the present disclosure may be an integrated circuit chip with a signal processing capability. In a process of implement above method, each operation of the above method embodiments may be completed by an integrated logic circuit of a hardware in the processor or instructions in a form of software. The above processors may be general purpose processors, Digital Signal Processors (DSPs), Application Specific Integrated Circuits (ASICs), Field Programmable Gate Arrays (FPGAs) or other programmable logic components, discrete gates or transistor logic components, or discrete hardware components. Each method, operation and logic block diagram disclosed in some embodiments of the present disclosure may be implemented or performed. The general processor may be a microprocessor or the processor may also be any conventional processor, etc. The operations in combination with the methods in some embodiments of the present application may be directly performed by a hardware decoding processor or the combination of a hardware and a software module in the decoding processor. The software module may be located in a random access memory, a flash memory, a read-only memory, a programmable read-only memory, or an electrically erasable programmable memory, a register, or other mature storage medium in the field. The storage medium is located in a memory, and the processor reads information in the memory and completes the operations of the above methods in combination with the hardware.

It should be understood that the memory in some embodiments of the present disclosure may be a transitory memory and/or a non-transitory memory. The non-transitory memory may be a Read-Only Memory (ROM), a Programmable ROM (PROM), an Erasable PROM (EPROM), an Electrically erasable EPROM (EEPROM) or a flash memory. The transitory memory may be a Random Access Memory (RAM), which is configured as an external cache. By a way of illustration but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchrolink DRAM (SLDRAM), and a Direct Rambus RAM (DR RAM). It should be noted that the memory of the systems and methods described herein is intended to include, but not limited to, these and any other suitable type s of memory.

It should be understood that the above memory is an example but not a limiting description. For example, the memory in some embodiments of the present disclosure may also be the SRAM, the DRAM, the SDRAM, the DDR SDRAM, the ESDRAM, the SLDRAM, or the DR RAM, etc. That is, the memory in some embodiments of the present disclosure is intended to include, but not limited to, these and any other suitable types of memory.

Some embodiments of the present disclosure also provide a computer-readable storage medium configured to store a computer program.

In some embodiments, the computer-readable storage medium may be applied to the configuration device in some embodiments of the present disclosure, and the computer program enables a computer to perform the corresponding operations implemented by the first configuration device in the various methods of some embodiments of the present disclosure. For simplicity, they are not repeated here.

In some embodiments, the computer-readable storage medium may be applied to the smart terminal in some embodiments of the present disclosure, and the computer program enables the computer to perform the corresponding operations implemented by the smart terminal in the various methods of some embodiments of the present disclosure. For simplicity, they are not repeated here.

In some embodiments, the computer-readable storage medium may be applied to the configuration device in some embodiments of the present disclosure, and the computer program enables a computer to perform the corresponding operations implemented by the second configuration device in the various methods of some embodiments of the present disclosure. For simplicity, they are not repeated here.

Some embodiments of the present disclosure also provide a computer program product including a computer program instruction.

In some embodiments, the computer program product may be applied to the configuration device in some embodiments of the present disclosure, and the computer program instruction enables a computer to perform the corresponding operations implemented by the first configuration device in the various methods of some embodiments of the present disclosure. For simplicity, they are not repeated here.

In some embodiments, the computer program product may be applied to the smart terminal in some embodiments of the present disclosure, and the computer program instruction enables a computer to perform the corresponding operations implemented by the smart terminal in the various methods of some embodiments of the present disclosure. For simplicity, they are not repeated here.

In some embodiments, the computer program product may be applied to the configuration device in some embodiments of the present disclosure, and the computer program instruction enables a computer to perform the corresponding operations implemented by the second configuration device in the various methods of some embodiments of the present disclosure. For simplicity, they are not repeated here.

Some embodiments of the present disclosure also provide a computer program.

In some embodiments, the computer program may be applied to the configuration device in some embodiments of the present disclosure, and the computer program instruction enables a computer to perform the corresponding operations implemented by the first configuration device in the various methods of some embodiments of the present disclosure. For simplicity, they are not repeated here.

In some embodiments, the computer program may be applied to the smart terminal in some embodiments of the present disclosure, and the computer program instruction enables a computer to perform the corresponding operations implemented by the smart terminal in the various methods of some embodiments of the present disclosure. For simplicity, they are not repeated here.

In some embodiments, the computer program may be applied to the configuration device in some embodiments of the present disclosure, and the computer program instruction enables a computer to perform the corresponding operations implemented by the second configuration device in the various methods of some embodiments of the present disclosure. For simplicity, they are not repeated here.

Those skilled in the art may realize that the units and algorithm operations of each example described in combination with some embodiments described herein may be implemented by an electronic hardware, or a combination of a computer software and an electronic hardware. Whether these functions are implemented in a hardware or a software depends on a specific application and design constraints of the technical solutions. A professional and technical personnel may use different methods for each specific application to implement the described functions, but such implementation should not be considered beyond the scope of the present disclosure.

Those skilled in the art may clearly understand that for convenience and conciseness of description, the specific working process of the system, the apparatus and the unit described above may refer to the corresponding operations in the above method embodiments, which are not repeated here.

In several embodiments provided herein, it should be understood that the disclosed systems, apparatus, and methods may be implemented in other ways. For example, the device embodiments described above are merely illustrative. For example, the division of the above units is only a logical function division. In actual implementation, there may be another division manner. For example, multiple units or components may be combined or integrated into another system, or some features can be ignored or not executed. In addition, the mutual coupling or direct coupling or communication connection shown or discussed may be an indirect coupling or communication connection through some interfaces, devices or units, and may be electrical or in other forms.

The units described as separate units may or may not be physically separated, and the component described as display units may or may not be physical units, that is, they may be located in one place or distributed to a plurality of network units. Some or all of the units may be selected according to the actual needs to implement the purpose of the present disclosure.

In addition, various functional units in some embodiments of the present disclosure may be integrated in one processing unit, or each unit may exist physically independently, or two or more units may be integrated in one unit.

The functions may be stored in a computer-readable memory if functions are implemented in the form of a software functional unit and sold or used as a standalone product. Based on such understanding, the technical solution of the present disclosure, in essence or the contribution to the prior art, or part of the technical solution may be embodied in the form of a software product. The software product may be stored in a memory. The software product may include a number of instructions causing a computer device (the computer device may be a personal computer, a server or a network device, and the like) to perform all or parts of the operations of the above-described methods of various embodiments of the present disclosure. The foregoing memory may include various media which are able to store program codes. The media may include a U disk, a ROM, a mobile disk, a RAM, a removable hard disk, a magnetic disk, an optical disk, and the like.

The above description is only some embodiments of the present disclosure, but the scope of the present disclosure is not limited to this. Any change or replacement that can be thought by those skilled within the technical scope disclosed in the present disclosure should be covered in the scope of the present disclosure. Therefore, the scope of the present disclosure shall be subject to the scope of the claims.

What is claimed is:

1. A wireless communication method, comprising:
receiving, by a first configuration device, role information configured to indicate a role of a device represented by a certificate, the role information comprising a role identifier (ID);
transmitting, by the first configuration device, first information to a smart terminal, the first information comprising a target application certificate at least comprising the role information;
receiving, by the first configuration device, an authentication request transmitted by a second configuration device, the authentication request comprising a first random number; and
transmitting, by the first configuration device, an authentication response to the second configuration device, the authentication response comprising a root certificate, a first application certificate, and a first signature of the first configuration device, the first application certificate being an application certificate of the first configuration device before being updated, and the first signature being acquired as the first configuration device signs the first random number using a private key of the first configuration device.

2. The method as claimed in claim 1, wherein the target application certificate is configured for the smart terminal to determine an access privilege that the first configuration device has for the smart terminal.

3. The method as claimed in claim 1, further comprising:
transmitting, by the first configuration device, second information to a Certificate Authority (CA) device, the second information being configured to request to update an application certificate, and the second information at least comprising the role information; and
receiving, by the first configuration device, third information transmitted by the CA device, the third information comprising the target application certificate.

4. The method as claimed in claim 3, wherein the second information further comprises the first application certificate, and the first application certificate is the application certificate of the first configuration device before being updated.

5. The method as claimed in claim 1, wherein the role information further comprises a validity period of the role ID, and a first target signature; the first target signature is a signature which a device sharing the role information generates for the role ID and the validity period of the role ID using a private key of the device.

6. The method as claimed in claim 1, wherein the role information further comprises an ID of the first configuration device, a validity period of the role ID, and a second target signature; the second target signature is a signature which a device sharing the role information generates for the role ID, the ID of the first configuration device, and the validity period of the role ID using a private key of the device.

7. The method as claimed in claim 1, wherein the role information further comprises an ID of the first configuration device, and a third target signature; the third target signature is a signature a device sharing the role information generates for the role ID and the ID of the first configuration device using a private key of the device.

8. The method as claimed in claim 1, further comprising:
receiving, by the first configuration device, request information transmitted by the second configuration device, the request information being configured to request the root certificate and a public key of the first configuration device; and
transmitting, by the first configuration device, response information to the second configuration device, the response information comprising the root certificate and the public key of the first configuration device.

9. The method as claimed in claim 1, further comprising:
transmitting, by the first configuration device, configuration information to the smart terminal, the configuration information being configured to configure the smart terminal.

10. The method as claimed in claim 1, wherein the receiving, by a first configuration device, role information, comprises:
receiving, by the first configuration device, a Node Operational Certificate (NOC) certificate from the second configuration device, the NOC certificate comprising the role information.

11. A configuration device, comprising:
a memory, configured to store a computer program and;
a processor, configured to call and run the computer program stored in the memory, to cause the configuration device to perform:
receiving role information configured to indicate a role of a device represented by a certificate, the role information comprising a role identifier (ID);
transmitting first information to a smart terminal, the first information comprising a target application certificate at least comprising the role information;
receiving an authentication request transmitted by a second configuration device, the authentication request comprising a first random number; and
transmitting an authentication response to the second configuration device, the authentication response comprising a root certificate, a first application certificate, and a first signature of the first configuration device, the first application certificate being an application certificate of the first configuration device before being updated, and the first signature being acquired as the first configuration device signs the first random number using a private key of the first configuration device.

12. The configuration device as claimed in claim 11, wherein the target application certificate is configured for the smart terminal to determine an access privilege that the first configuration device has for the smart terminal.

13. The configuration device as claimed in claim 11, wherein the processor is configured to call and run the computer program stored in the memory, to cause the configuration device further to perform:
transmitting second information to a Certificate Authority (CA) device, the second information being configured to request to update an application certificate, and the second information at least comprising the role information; and
receiving third information transmitted by the CA device, the third information comprising the target application certificate.

14. The configuration device as claimed in claim 13, wherein the second information further comprises the first application certificate, and the first application certificate is the application certificate of the first configuration device before being updated.

15. The configuration device as claimed in claim 11, wherein the role information further comprises a validity period of the role ID, and a first target signature; the first target signature is a signature which a device sharing the role information generates for the role ID and the validity period of the role ID using a private key of the device.

16. The configuration device as claimed in claim 11, wherein the role information further comprises an ID of the first configuration device, a validity period of the role ID, and a second target signature; the second target signature is a signature which a device sharing the role information generates for the role ID, the ID of the first configuration device, and the validity period of the role ID using a private key of the device.

17. The configuration device as claimed in claim 11, wherein the role information further comprises an ID of the first configuration device, and a third target signature; the third target signature is a signature a device sharing the role information generates for the role ID and the ID of the first configuration device using a private key of the device.

18. The configuration device as claimed in claim 11, wherein the processor is configured to call and run the computer program stored in the memory, to cause the configuration device further to perform:

receiving request information transmitted by the second configuration device, the request information being configured to request the root certificate and a public key of the first configuration device; and transmitting response information to the second configuration device, the response information comprising the root certificate and the public key of the first configuration device.

19. The configuration device as claimed in claim 11, wherein the processor is configured to call and run the computer program stored in the memory, to cause the configuration device further to perform:

transmitting configuration information to the smart terminal, the configuration information being configured to configure the smart terminal.

20. The configuration device as claimed in claim 11, wherein the processor is configured to call and run the computer program stored in the memory, to cause the configuration device further to perform:

receiving a Node Operational Certificate (NOC) certificate from the second configuration device, the NOC certificate comprising the role information.

* * * * *